United States Patent [19]

Lee et al.

[11] Patent Number: 5,446,730
[45] Date of Patent: Aug. 29, 1995

[54] METHOD FOR DYNAMIC CONNECTION MANAGEMENT IN INTEGRATED COMMUNICATION NETWORKS

[75] Inventors: Whay C. Lee, Cambridge; Michael G. Hluchyj, Wellesley, both of Mass.

[73] Assignee: Motorola, Inc., Schaumburg, Ill.

[21] Appl. No.: 123,774

[22] Filed: Sep. 20, 1993

[51] Int. Cl.$^6$ ............................................ H04Q 11/00
[52] U.S. Cl. ................................................ 370/54; 370/17
[58] Field of Search ........................ 370/54, 53, 16, 17, 370/84, 94.1; 371/32, 33

[56] References Cited

U.S. PATENT DOCUMENTS

| 5,038,340 | 8/1991 | Ochiai | 370/54 |
| 5,164,938 | 11/1992 | Jurkevich et al. | 370/84 |
| 5,179,556 | 1/1993 | Turner | 370/84 |
| 5,280,483 | 1/1994 | Kamoi et al. | 370/94.1 |
| 5,301,191 | 4/1994 | Otani | 370/84 |

OTHER PUBLICATIONS

W. Lee & P. Kamat, "Integrated Packet Networks with Quality of Service Constraints," Proc. of IEEE Globecom '91, pp. 8A.3.1–8A.3.5, Dec. 2–5, 1991.
W. Lee & P. Kamat, "Quality of Service Matching for Integrated Fast Packet Networks," Proc. of IEEE Globecom '92, pp. 931–937, Dec. 6–9, 1992.
W. Lee, M. Hhuchyj, & P. Humblet, "Rate-Based Call-by-Call Source. Routing for Integrated Communication Networks," Proc. of IEEE Infocom '93, Mar. 28–Apr. 1993.
W. Stallings, ISDN-An Introduction, Macmillan Publishing Company, 1989.
S. Crosby, "In–Call Renegotiation of Traffic Parameters," IEEE Infocom '93, Mar. 28–Apr. 1, 1993.
T1S1/91-352 document: Integrated Services Digital Network (ISDN)—Digital Subscriber Signaling System No. 1 (SDD1)—Signaling Specification of Frame Relay Bearer Service, 1991.

Primary Examiner—Douglas W. Olms
Assistant Examiner—Shick Hom
Attorney, Agent, or Firm—Darleen J. Stockley

[57] ABSTRACT

A method (800, 900, 1000) provides dynamic connection management in integrated communication networks such that an acceptable quality of service (QOS) over an entire duration of a connection is maintained. For example, the present invention facilitates adjustment of the QOS towards a requested level for a permanent voice call, holding a connection intact until a desired path is obtained. Where possible, a new path for the connection provides at least one agreed value that is renegotiated to a more desirable value without degrading the other agreed values.

10 Claims, 8 Drawing Sheets

METHOD FOR DYNAMIC CONNECTION MANAGEMENT IN INTEGRATED COMMUNICATION NETWORKS

FIELD OF THE INVENTION

This invention is generally directed to connection management in communication networks and is more specifically directed to dynamic connection management in integrated communication networks.

This application is copending with related U.S. patent application Ser. No. 08/123,773 filed Sep. 20, 1993.

BACKGROUND

In a connection-oriented communication network, the transfer of information between two end-users is accomplished by network functions that select and allocate network resources along an acceptable path. The logical association between the communicating end-users is referred to as a call. The chain of associated network resources that support the call is referred to as a connection. Connection management is a network function that is responsible for setting up, maintaining, and taking down connections. Each call request is issued with a set of quality of service (QOS) requirements that govern the resource allocation for the desired connection.

Conventional allocation of network resources for connection management is by and large static. A fixed level of quality of service, specified by the user, is to be matched at connection setup for a call, and the same must be maintained by best efforts throughout the duration of the call. Certain performance parameters, such as throughput and delay, are negotiated to determine their respective agreed values. The same agreed values must ideally be met as long as the call is active. When the need arises such that the agreed QOS must be adjusted, the call and supporting connection are taken down and the call establishment process is started anew.

Static allocation of network resources is inefficient, and is clearly inadequate for a dynamic networking environment where the user requirements and the quality characteristics of network resources are not static. Resources on a link may degrade in performance, and yet the link is still regarded as operational because appropriate performance thresholds are not exceeded. For example, when a leased facility serving as an internodal link is switched from a non-satellite link to a satellite link, the delay performance for a connection using the link may be degraded considerably. On a satellite link, weather changes can cause accuracy values to fluctuate so much that the accuracy performance for a connection using the link may be degraded considerably.

With user demands that vary with the time of the day, and the bursty nature of many traffic types, a network is prone to sporadic heavy loads. A connection that is established or reestablished when the network is heavily loaded tends to receive a less than a desirable QOS level. This may be acceptable for connections that do not last a long time. But for permanent connections, this is highly undesirable.

With the introduction of ISDN (Integrated Services Digital Network), communication networks supporting diverse QOS have become a reality. Due to different traffic characteristics and QOS requirements, it has become necessary to allow the users to negotiate the values of certain performance parameters. One of the biggest challenges for today's integrated networks is to guarantee the negotiated QOS in a dynamic network environment.

In ISDN, each negotiable performance parameter is assigned an acceptable value. A user who wishes to use values that are more desirable than the acceptable values may configure a requested value for each of the parameters. In a parameter negotiation, an agreed value is determined so that it is within the range between the acceptable value and the requested value. The agreed value is made available by the network at call establishment time, but not guaranteed for the duration of the connection. The agreed value may not be adjusted within the duration of the call.

In-call renegotiation of performance parameters for dynamic allocation of network resources is known. For example, the user whose demand for network resources is changing may send a renegotiation request to the network. If sufficient resources are available to accommodate the request, the performance adjustment is permitted, with possible rerouting of the connection required. Otherwise, the request is rejected. After such a denial, the user has to wait for a random length of time before issuing another request. The drawback of this approach is that it involves in-call interactions between the user and the network. Moreover, it does not address the problem of quality of service falling out of match as the allocated resources degrade in performance.

In the prior art, there are preemptive network resource allocation strategies based on disruptive retrieval of network resources that have already been allocated to existing calls in order to accommodate new calls of greater importance. Typically, a call that is preempted is either terminated prematurely, or considered for reestablishment. In the attempt to reestablish a preempted call, if the previously agreed performance values could not be satisfied, the call is also terminated.

Due to occasional changes in transmission facilities or service requirements, the QOS offered at call establishment time may be degraded. To guarantee the negotiated performance values over the entire duration of a connection, the network must monitor changes in the network, and take timely and appropriate actions whenever QOS degradation is detected. Transmission facilities may at times be degraded beyond operational. The network must also provide the capability to reroute connections that are affected. In a network where call preemption is allowed, the network must minimize such disruption by rerouting preempted calls.

Thus, there is a need for a system and method that addresses the problem of managing connections, in a connection-oriented integrated communication network, to maintain acceptable QOS for the entire duration of each connection, to make QOS improvements whenever it is possible, as well as to recover from connection failures and preemption.

DETAILED DESCRIPTION OF A PREFERRED EMBODIMENT

The present invention applies to integrated networks that support diverse traffic types, and a variety of user connections, including switched connections, that are user initiated and generally do not last very long, and permanent connections that are administered by the network operator and must be maintained at all times.

QOS requirements for a connection are specified in terms of performance constraints (e.g., throughput, delay), resource constraints (e.g., carrier, security), and priority constraints (e.g., establishment priority, retention priority). During call setup, a routing function (subsequently referred to as Routing), computes a path that satisfies all these QOS constraints, where possible. The present invention employs the rule-based call-by-call source routing strategy.

A performance constraint may be non-negotiable or negotiable. A non-negotiable performance constraint is specified with an acceptable value that separates the entire range of possible performance values into two contiguous regions: unacceptable region, and acceptable region. A negotiable performance constraint is specified with a range of values bounded between an acceptable value and a requested value. The requested value divides the acceptable region into two regions. The region bounded by the acceptable value together with the requested value is referred to as the agreeable region. The other region is referred to as the overkill region.

Figure 1:
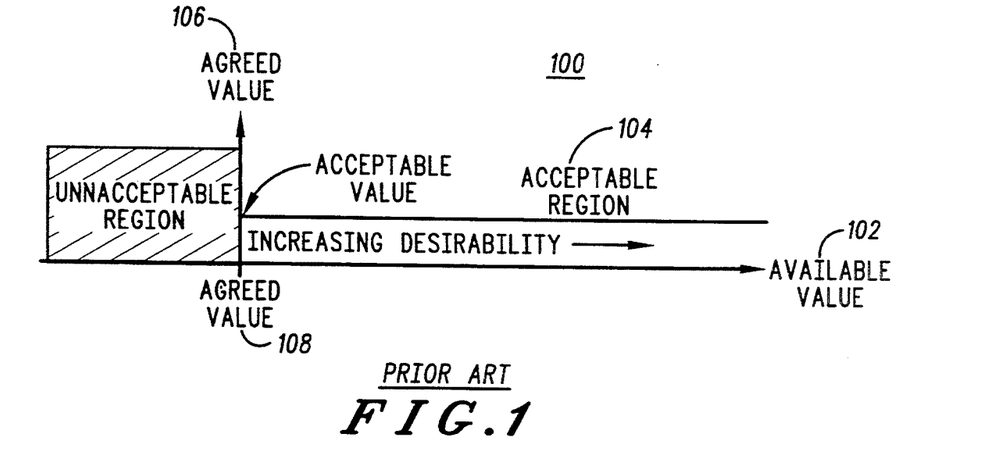
FIG. 1 is a graph showing a mapping of the available value onto the agreed value based on the value regions for a non-negotiable performance constraint, as is known in the prior art.
Figure 2:
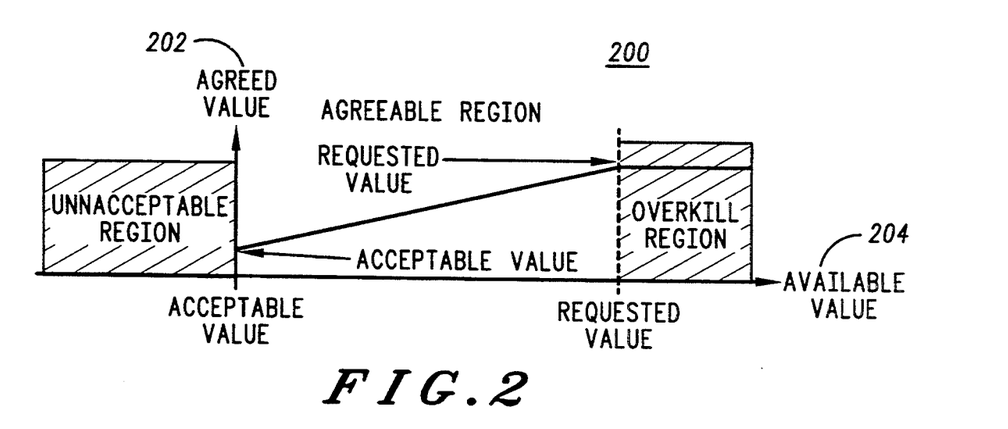
FIG. 2 is a graph showing a mapping of the available value onto the agreed value based on the value regions for a continuously negotiable performance constraint, as is known in the prior art.
Figure 3:
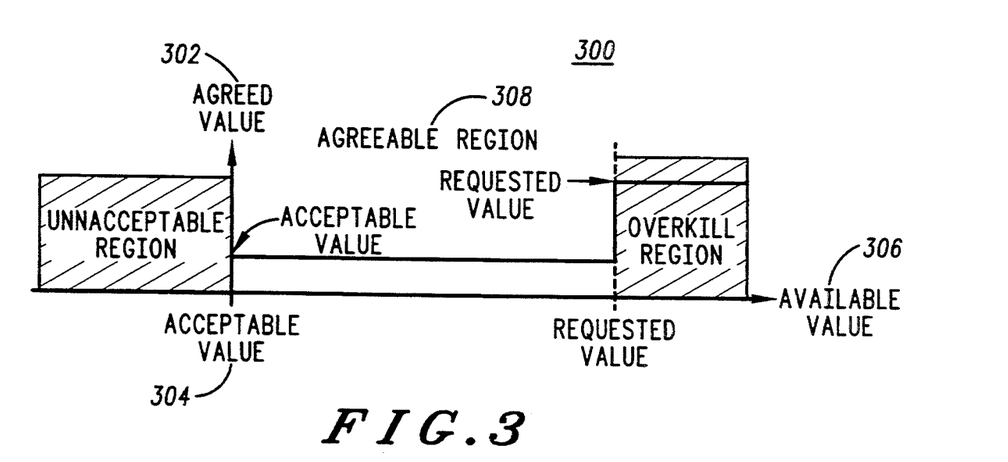
FIG. 3 is a graph showing a mapping of the available value onto the agreed value based on the value regions for a stepwise negotiable performance constraint.

During call setup, Routing computes a path, and derives from it an available value for each performance parameter. If the available value falls within the unacceptable region, the call is rejected. FIG. 1, numeral 100, is a diagram showing a mapping of the available value to the agreed value based on the value regions for the performance constraint. For non-negotiable performance constraints, if the available value (102) falls within the acceptable region (104), the acceptible value (108) is taken to be the agreed value (106), i.e., one that the end-users will accept and the network will support. Each negotiable performance constraint is subject to negotiation that determines an agreed value from within the agreeable range provided an acceptable path is available. During a negotiation, if the available value falls within the overkill region, the call is accepted, but only the requested value would be offered as the agreed value. For the present invention, when the available value falls within the agreeable region, the agreed value is arbitrary as long as it is within the same region. In the prior art (e.g., ISDN), as shown in FIG. 2, numeral 200, a diagram showing a mapping of the available value to the agreed value based on the value regions for a continuously negotiable performance constraint, the agreed value (202) is taken to be the available value (204). Yet another example, shown in FIG. 3, numeral 300, a diagram showing a mapping of the available value to the agreed value based on the value regions for a stepwise negotiable performance constraint, is letting the agreed value (302) be the acceptable value (304) whenever the available value (306) falls within the agreeable region (308).

Resource constraints are specified with multi-level preferences ("required", "preferred", "don't_care", and "don't_use"), but are translated into acceptable and requested resource constraint sets. Each resource constraint set contains a subset of all resource attribute values, such that the requested resource constraint set is a subset of the acceptable resource constraint set. Resource constraints may also be directly specified in terms of these two constraint sets. During call setup, Routing first tries to find a path that satisfies the requested resource constraint set and other QOS constraints. If this attempt fails, Routing will use the acceptable resource constraint set for subsequent fallback path computations. When a path is accepted, the resource constraint set used in the final path computation is referred to as the effective resource constraint set (or effective resource constraints).

Priority constraints are specified in terms of three connection priorities: establishment priority, retention priority, and re-establishment priority. Each priority may assume one of a predetermined number of levels. During call setup, preemption is permitted only after Routing has tried in vain to find an acceptable path without resorting to preemption.

Figure 4:
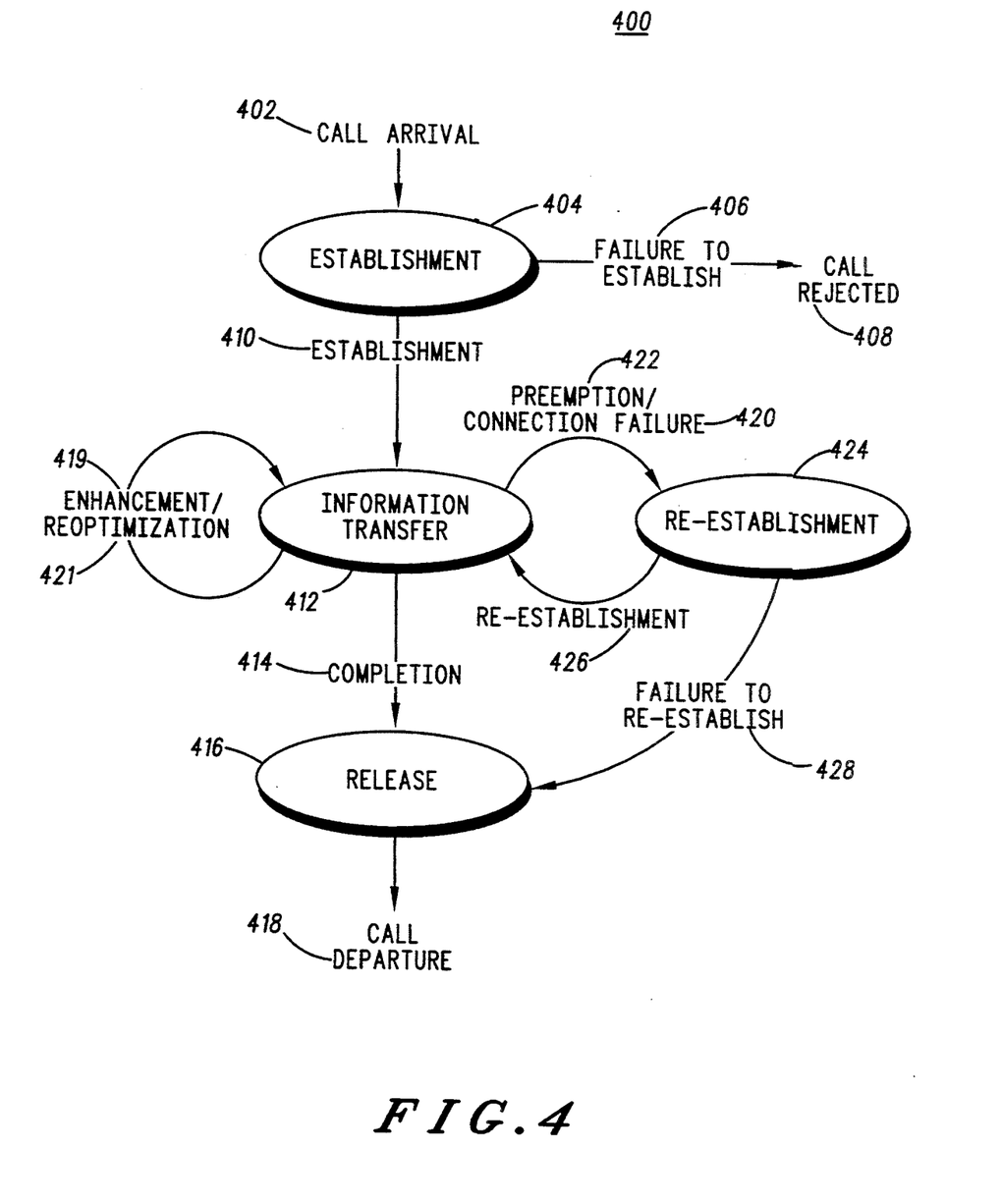
FIG. 4 is a connection state diagram for the present invention.

In the preferred embodiment, the present invention offers a novel approach to connection management by providing an enhancement procedure coupled with a reoptimization procedure, update rules for negotiable performance constraints, and extension of the preemption mechanism. The reoptimization procedure and the enhancement procedure may also be implemented independently. A connection management strategy can be represented schematically by means of a connection state diagram. FIG. 4, numeral 400, is a connection state diagram for the present invention. The enhancement transition from the Information Transfer state to itself is a novel element of the present invention.

When a call arrives (call arrival, 402), it enters the Establishment state (404). If there are not enough resources to support the call, there will be a failure to establish (406), and the call will be rejected (408). Otherwise, upon successful connection establishment (410) (i.e., a path is available such that all QOS constraints are satisfied), the call enters the Information Transfer state (412). When a call in the Information Transfer state is completed (414), it enters the Release state (416), and the connection is subsequently taken down (call departure, 418).

When a call is in the Information Transfer state (412), its agreed performance values may fall out of match (i.e., the offered values degrade) due to facility changes, link failures, and the like. As long as the QOS degradation is within acceptable limits, the call remains in the Information Transfer state (412). If any degradation leads to a connection failure (420), or the call is preempted (422), the call enters the Re-establishment state (424), so that the network may attempt to re-establish the connection.

When a call is in the Re-establishment state (424), the network attempts to find a new acceptable path for connection re-establishment. Upon successful re-establishment (426), the call reenters the Information Transfer state (412). The length of time in which a connection re-establishment attempt may be repeated is limited by a connection re-establishment delay, which is a predetermined network-wide parameter and is often in the prior art. Beyond this delay, the re-establishment procedure is aborted (failure to re-establish, 428), and the call enters the Release state (416).

A call in the Information Transfer state (412) is subject to enhancement (419) to restore degraded performance values back to their agreed levels, and to avoid the use of resources that do not satisfy the requested resource constraints. For calls whose rate may be dynamically adjusted (e.g., permanent voice calls), enhancement is also used for facilitating the drift of the rate towards the requested level. In the process of enhancement, the connection remains intact until a desired path is found. The call also remains in the Information Transfer state. Although the enhancement procedure may also minimize cost, it does not have to guarantee that the cost of the enhanced path, if available, is no greater than that of the existing path. The cost may increase because better QOS is provided. An enhanced connection may later be subject to reoptimization (421) for cost improvement. Enhancement involves finding a new path for the connection such that at least one agreed value is renegotiated to a more desirable value and none of the other agreed values is degraded. In addition, the requested resource constraints are also satisfied. Enhancement may be triggered by the network administrator, periodically, or by time-of-day.

Reoptimization is a connection management procedure for cost improvement. Due to changes in the network or changes to supported connections, the cost of a given connection may not be minimum all the time. Consider failure recovery as an example. After a link has failed, it is usually repaired after some time, or switched digital facilities are added to supplement the impaired network. By then, many affected connections might have already been re-established over paths with possibly higher costs. Reoptimization is useful in preventing these connections from being stuck with the unnecessarily costly paths. Reoptimization is applicable whenever a call is in the Information Transfer state. It can be triggered by the network administrator, periodically, or by time-of-day. In reoptimization, all agreed performance values and the effective resource constraints must not be degraded. In addition, the cost must be reduced by a network-configurable threshold which may be specified in terms of a percentage for improvement (%_improve) parameter. The value of this parameter must not be too small, or all the effort of reoptimization will not be worth the insignificant cost reduction. The value must not be too large either, or reoptimization will hardly succeed. In the process of reoptimization, the connection remains intact until a desired path is found. The call also remains in the Information Transfer state.

In the preferred embodiment of this invention, the enhancement procedure is coupled to the reoptimization procedure. Reoptimization is permitted only when the currently agreed QOS for each performance constraint is maintained at the most desirable level possible, subject to the appropriate update rule for the performance constraint (See later description for FIG. 10). Otherwise, enhancement is applicable.

When a call is preempted, it enters the Re-establishment state for reroute. There are three possible outcomes for connection re-establishment: hard preemption, soft preemption, and disguised preemption. The re-establishment may fail, whereupon the call enters the Release state and is subsequently disconnected. This outcome is referred to as a hard preemption. Should a preempted call be successfully re-established, there are either enough resources for the preempted call to be re-established with its previously agreed throughput, or there are not enough resources such that its previously agreed throughput may be compromised (i.e., its throughput is lowered from its previously agreed level to its acceptable level, provided it is permitted). In the latter case, the re-established call is said to have suffered soft preemption to make room for a higher priority call. In the former case, since the connection has suffered but a minor glitch while it is being rerouted, this event is referred to as a disguised preemption. In both cases, the call returns to the Information Transfer state. Note that soft preemption is possible only when the throughput of the preempted call is renegotiable.

Figure 5:
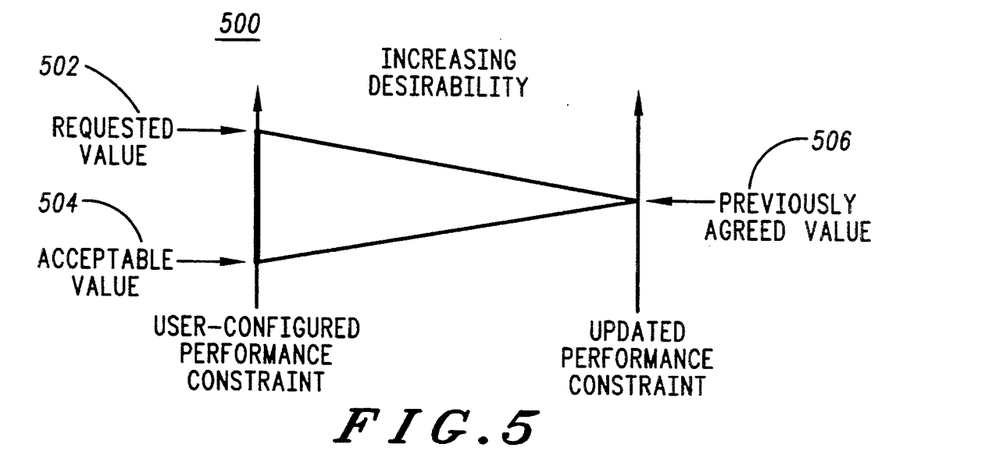
FIG. 5 is a diagram showing the update algorithm for the agreeable region of a performance constraint in accordance with the continuation rule of the present invention.
Figure 6:
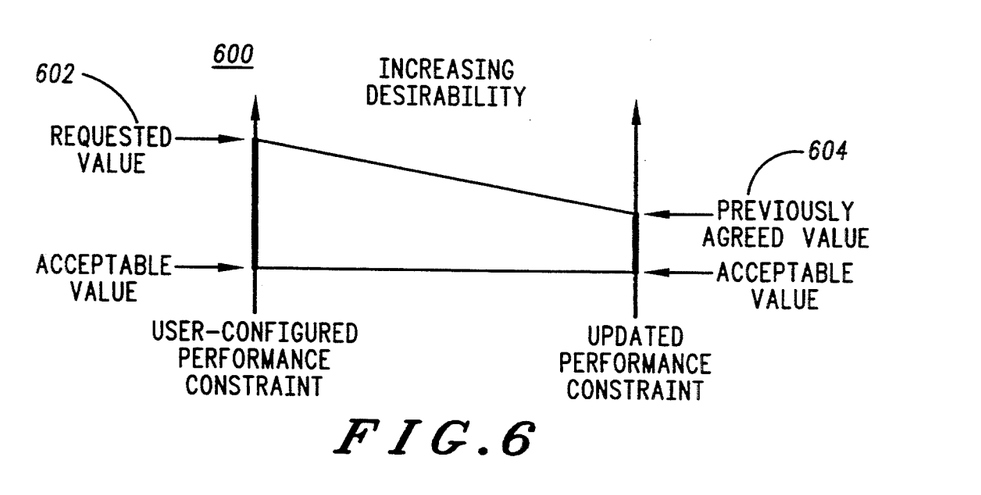
FIG. 6 is a diagram showing the update algorithm for the agreeable region of a performance constraint in accordance with the relaxation rule of the present invention.
Figure 7:
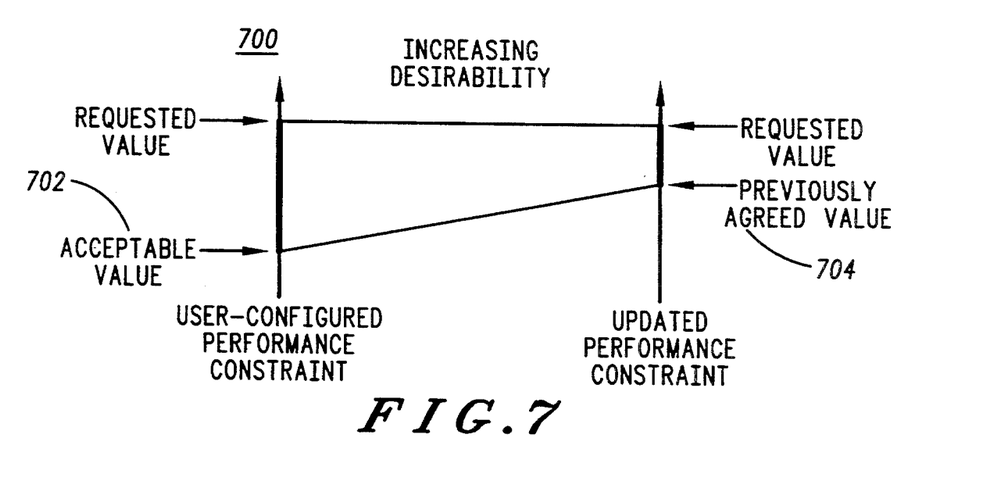
FIG. 7 is a diagram showing the update algorithm for the agreeable region of a performance constraint in accordance with the enhancement rule of the present invention.

For negotiable performance constraints, the acceptable and requested values may be updated for re-establishment, enhancement, and reoptimization, according to one of the following rules: continuation rule, relaxation rule, and enhancement rule. In accordance with the continuation rule of the present invention, shown in the diagram in FIG. 5 (numeral 500), both the requested (502) and acceptable (504) values associated with a given negotiable performance constraint are set to the previously agreed value (506), so that this value continues to be guaranteed. In accordance with the relaxation rule of the present invention, shown in FIG. 6, numeral 600, the requested value (602) is replaced by the previously agreed value (604). In accordance with the enhancement rule of the present invention, shown in FIG. 7, numeral 700, the acceptable value (702) is replaced by the previously agreed value (704). The update of the agreeable range is used only for the routing computation that is called for by the re-establishment, enhancement, or reoptimization. It does not change the requested and acceptable values that are originally configured by the user.

Figure 8:
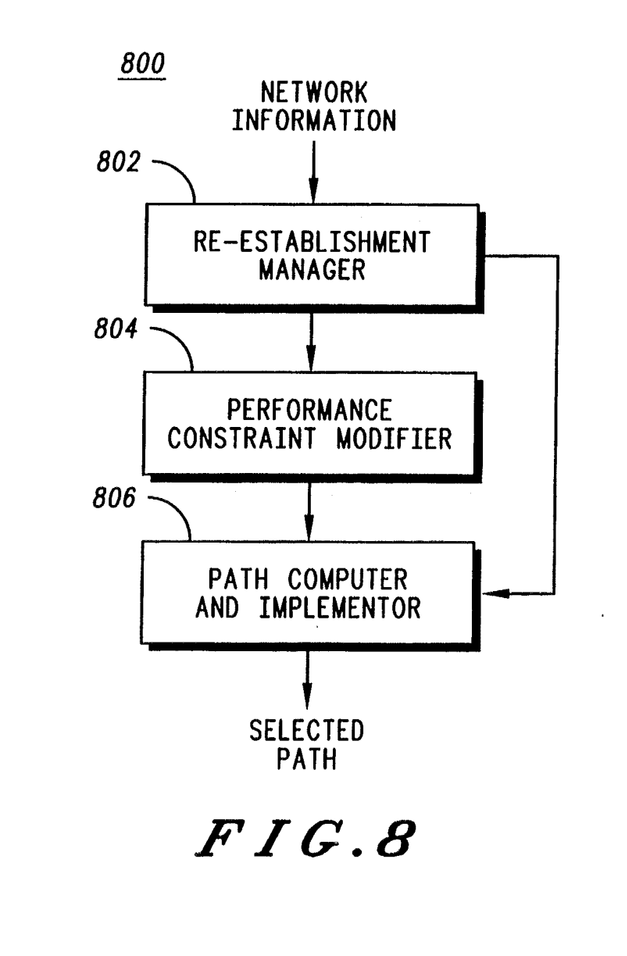
FIG. 8 is a block diagram of a first embodiment of a device for re-establishment in accordance with the present invention.

FIG. 8, numeral 800, is a block diagram of a first embodiment of a device for re-establishment in accordance with the present invention. The device provides dynamic connection management in integrated communication networks such that an acceptable quality of service (QOS) over an entire duration of a connection is maintained. The device includes a re-establishment manager (802), a performance constraint modifier (804), and a path computer/implementor (806).

The re-establishment manager (802) determines when re-establishment is needed, and monitors the extent of re-establishment retry, utilizing re-establishment timing/retry counting. In re-establishment timing, a limit is set on the length of time in which re-establishment retry attempts are permitted. In re-establishment retry counting, a limit is set on the number of re-establishment retry attempts permitted. The re-establishment manager (802) also instructs the performance constraint modifier (804) how performance constraints should be updated.

The performance constraint modifier (804) is operably coupled to the reestablishment manager (802) and applies one of three rules (continuation rule, relaxation rule, and enhancement rule) to each performance constraint according to the instructions from the re-establishment manager (802) to provide updated performance constraints. The performance constraint modifier is also utilized for enhancement and reoptimization, as described more fully in the description for FIG. 11 below.

The path computer/implementor (806) is operably coupled to the re-establishment manager (802) and to the performance constraint modifier (804) and determines a path that satisfies the updated performance constraints utilizing a predetermined routing strategy, and where such a path is available, implements the path according to a predetermined scheme that is controlled by the re-establishment manager (802). The performance constraint modifier is also utilized for enhancement and reoptimization, as described more fully in the description for FIG. 11 below.

Figure 9:
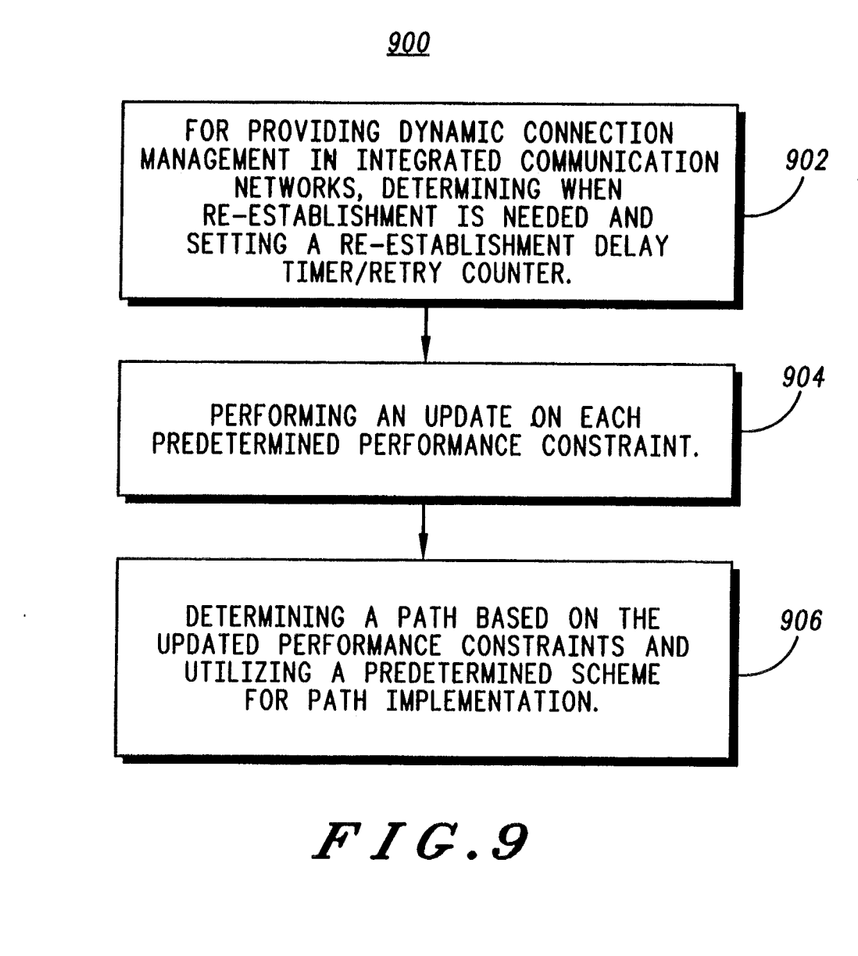
FIG. 9 is a flow chart for the steps of re-establishment in accordance with a first embodiment of the method of the present invention.

FIG. 9, numeral 900, is a flow chart for the steps of re-establishment in accordance with a first embodiment of the method of the present invention. This method provides dynamic connection management in integrated communication networks such that an acceptable quality of service (QOS) over an entire duration of a connection is maintained, and includes the steps of: A) determining when re-establishment is needed and setting a re-establishment delay timer/retry counter (902), B) performing an update on each predetermined performance constraint (904), and C) determining a path based on the updated performance constraints and utilizing a predetermined scheme for path implementation (906). The predetermined scheme for path implementation (906) typically includes the steps E through H described for FIG. 10 below.

Figure 10:
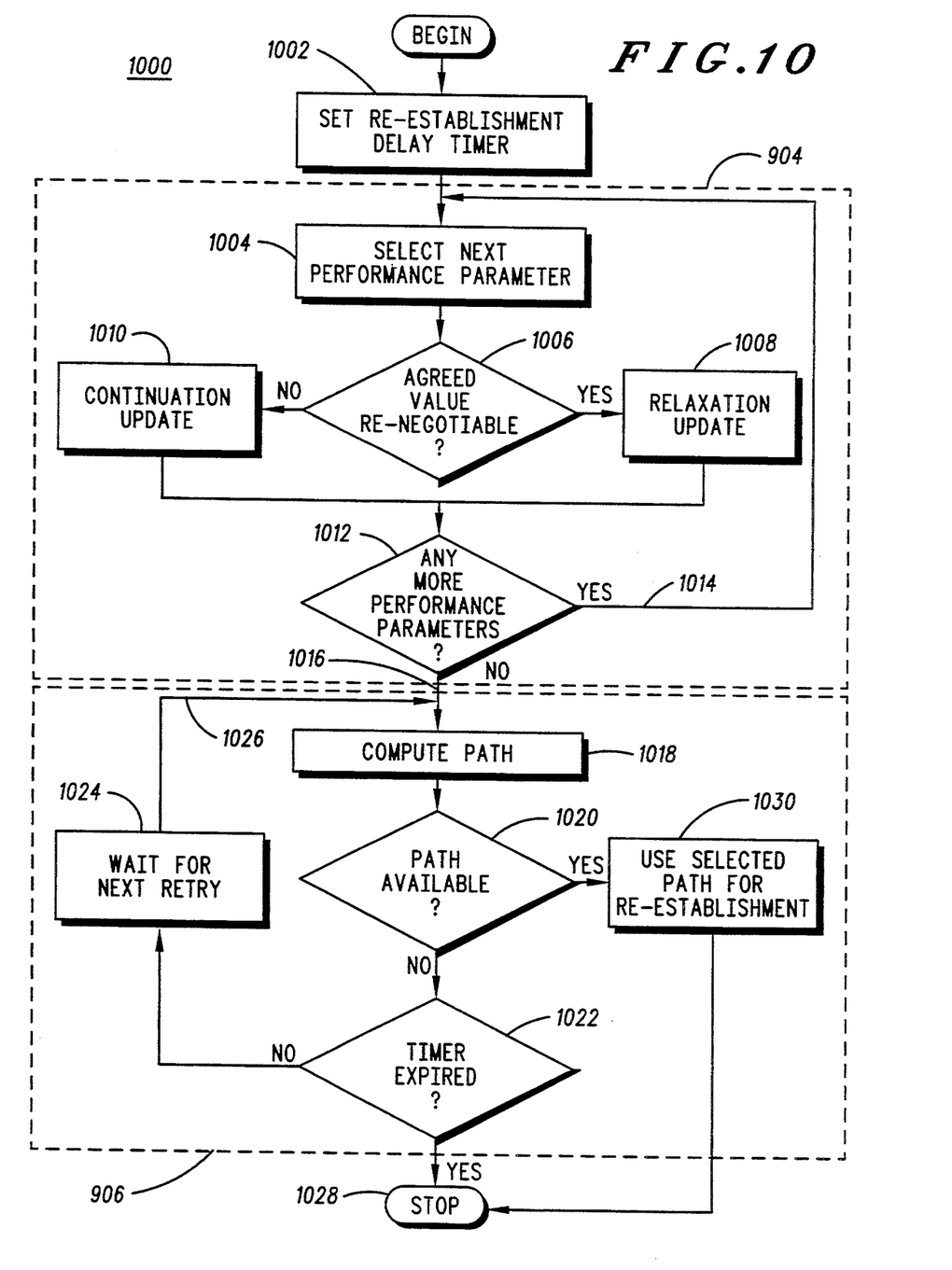
FIG. 10 is a flow chart for the steps of re-establishment in accordance with a second embodiment of the method of the present invention.

FIG. 10, numeral 1000, is a flow chart for the steps of re-establishment in accordance with a second embodiment of the method of the present invention which provides dynamic connection management in integrated communication networks such that an acceptable quality of service (QOS) over an entire duration of a connection is maintained. The method includes the steps of: A) setting a re-establishment delay timer to a predetermined time (1002), B) selecting a (next) predetermined performance parameter (1004), C) determining whether an agreed value associated with the performance parameter is renegotiable (1006), and where renegotiable, adjusting automatically the agreeable region associated with the performance parameter using a relaxation update (1008) and where non-renegotiable, adjusting using a continuation update (1010), D) determining whether there are any more predetermined performance parameters (PPPs) whose associated agreeable region is yet to be updated (1012) and one of: D1) where there is at least one PPP whose associated agreeable region is yet to be updated, recycling to step (B) (1014), and D2) where the agreeable region of every PPP has been updated, proceeding to step (E) (1016), E) computing a path in accordance with the updated performance constraints (1018), F) determining whether the path is available (1020), G) where the path is unavailable, determining whether the re-establishment delay timer has expired (1022), and one of G1-G2: G1) where the re-establishment delay timer is unexpired, waiting a predetermined time for a next retry (1024) and then recycling (1026) to computing a path in accordance with the updated performance constraints (step E), G2) where the re-establishment delay timer is expired, stopping (1028), and H) where the path is available (in step E), using the path for re-establishment (1030), then stopping (1028). As an alternative, the re-establishment timer may be replaced by a re-establishment retry counter. Instead of setting a re-establishment delay timer, a re-establishment retry counter may be set to a predetermined limit. Instead of checking whether the timer has expired, the counter is checked to determined if the predetermined limit has been reached.

Figure 11:
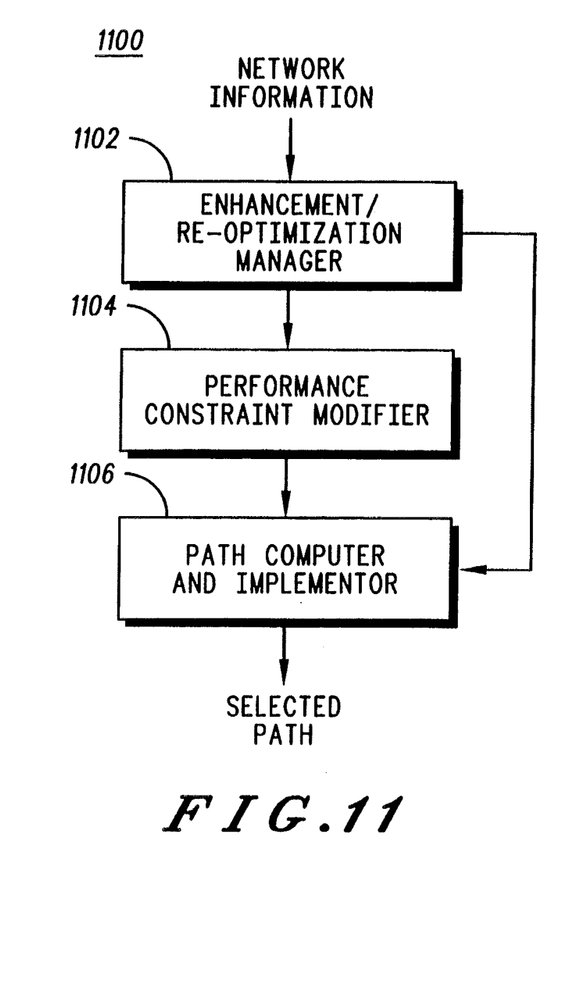
FIG. 11 is a block diagram of a second embodiment of a device for enhancement and reoptimization in accordance with the present invention.

FIG. 11, numeral 1100, is a block diagram of an embodiment of a device for enhancement and reoptimization in accordance with the present invention. The device provides dynamic connection management in integrated communication networks such that an acceptable quality of service (QOS) over an entire duration of a connection is maintained. The device includes a enhancement/reoptimization manager (1102), a performance constraint modifier (1104), and a path computer/implementor (1106).

The enhancement/reoptimization manager (1102) determines when enhancement/reoptimization is needed, adjusts the acceptable cost where reoptimization is appropriate, and provides the conditions for accepting an available path. The enhancement/reoptimization manager (1102) also instructs the performance constraint modifier (1104) how performance constraints should be updated.

The performance constraint modifier (1104) is operably coupled to the enhancement/reoptimization manager (1102), and applies one of three rules (continuation rule, relaxation rule, and enhancement rule) to each performance constraint according to the instructions from the enhancement/reoptimization manager (1102).

The path computer/implementor (1106) is operably coupled to the performance constraint modifier (1104) and to the enhancement/reoptimization manager (1102) and determines a path that satisfies the updated performance constraints utilizing a predetermined routing strategy, and if such a path is available, implements the path according to a predetermined scheme that is controlled by the enhancement/reoptimization manager (1102).

Figure 12:
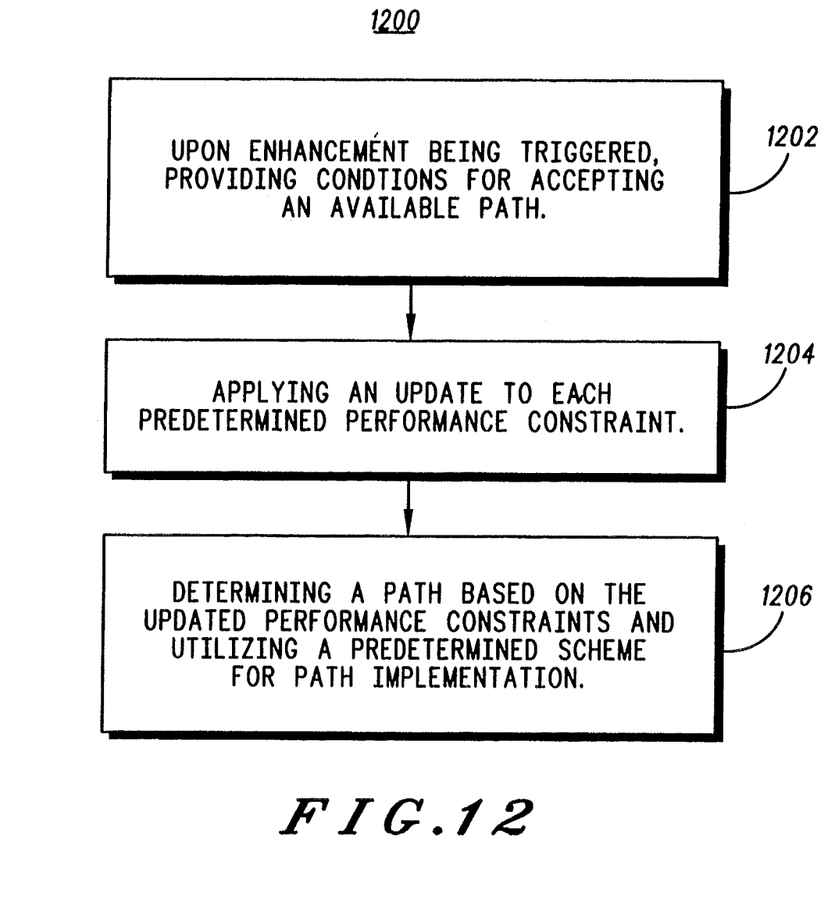
FIG. 12 shows a flow chart for the steps of enhancement and reoptimization in accordance with a third embodiment of the method of the present invention.

FIG. 12, numeral 1200, shows a flow chart for the steps of enhancement and reoptimization applied to an existing path in accordance with a third embodiment of the method of the present invention. This method provides dynamic connection management in integrated communication networks such that an acceptable quality of service (QOS) over an entire duration of a connection is maintained. The method includes the steps of: A) upon enhancement/reoptimization being triggered, adjusting the acceptable cost where reoptimization is appropriate, and providing conditions for accepting an available path (1202), B) applying an update to each predetermined performance constraint (1204), C) determining a new path based on the updated performance constraints and utilizing a predetermined scheme for path implementation (1206). The predetermined scheme for path implementation (1206) typically includes the steps H through Q described for FIG. 13 below.

Figure 13:
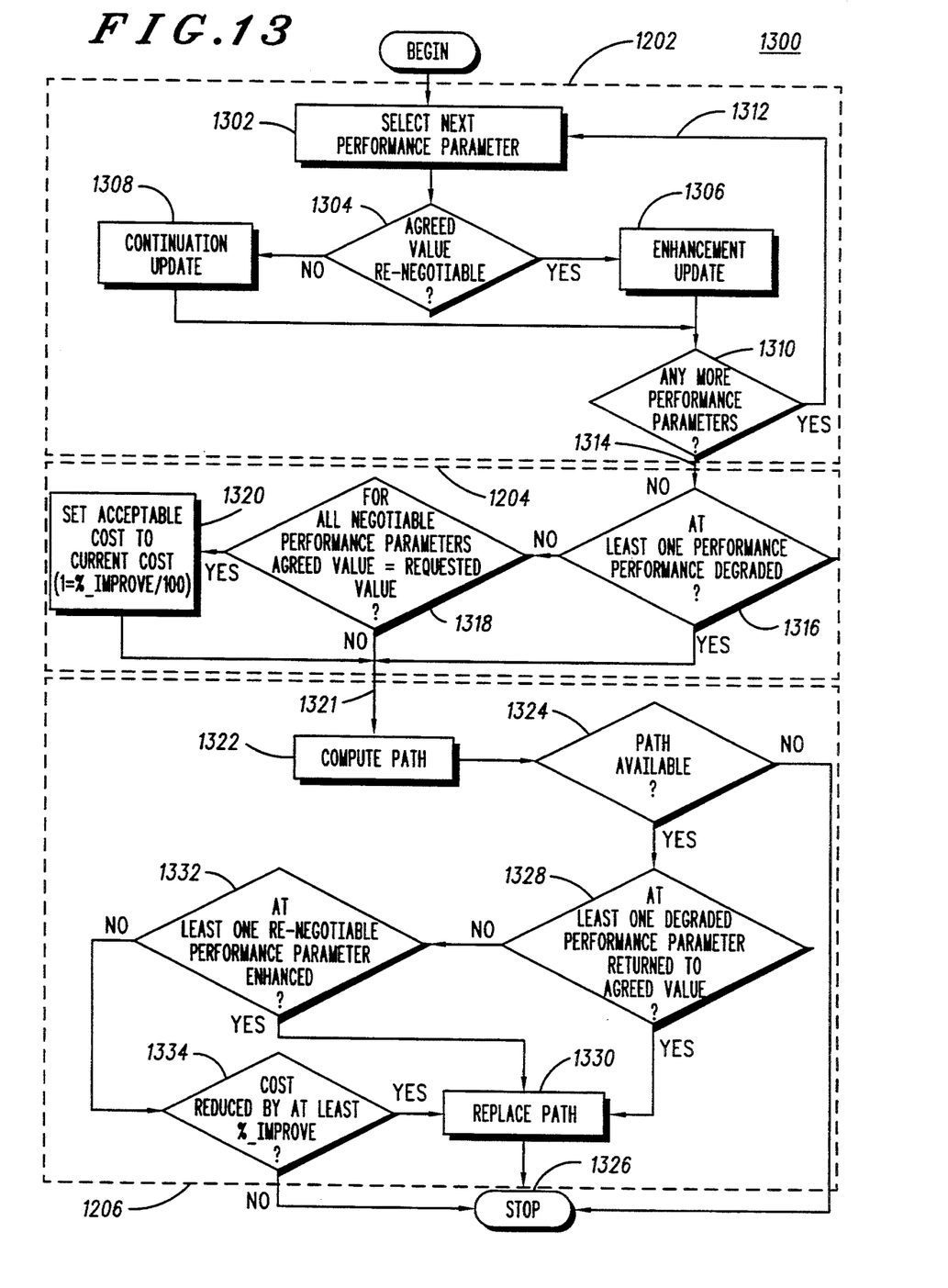
FIG. 13 shows a flow chart for the steps of enhancement and reoptimization in accordance with a fourth embodiment of the method of the present invention.

FIG. 13, numeral 1300, shows a flow chart for the steps of enhancement and reoptimization applied to an existing path in accordance with a fourth embodiment of the method of the present invention. This method provides dynamic connection management in integrated communication networks such that an acceptable quality of service (QOS) over an entire duration of a connection is maintained. The method includes the steps of: A) selecting a (next) predetermined performance parameter (PPP) (1302), B) determining whether an agreed value associated with the PPP is renegotiable (1304), and where renegotiable, adjusting automatically the agreeable region associated with the predetermined performance parameter using an enhancement update (1306), and where non-renegotiable, adjusting using a continuation update (1308), C) determining whether there are any more PPPs whose associated agreeable region is yet to be updated (1310) and one of: C1) where there is at least one PPP whose associated agreeable region is yet to be updated, recycling (1312) to step (A), and C2) where the agreeable region of every PPP has been updated, proceeding (1314) to step (D), D) determining whether at least one PPP has been degraded (1316), E) where all PPPs are undegraded, determining whether, for all renegotiable PPPs, the agreed value equals the requested value (1318), F) where, for all renegotiable PPPs, the agreed value equals the requested value, setting an acceptable cost (1320) to a form of: current_cost*(1-%_improve/100), G) where one of G1-G3: G1) at least one performance parameter has been degraded, proceeding (1321) to step H, G2) the agreed value is unequal to the requested value for at least one renegotiable performance constraint, and G3) an acceptable cost is set to a form of: current_cost*(1-%_improve/100) (i.e.,1320), H) determining a new path (computing a new path) in accordance with the updated performance constraints (1322), I) determining whether the new path is available (1324), J) where the new path is unavailable, stopping (1326), K) where the new path is available, determining whether at least one degraded PPP has been returned to an agreed value (1328), L) where at least one degraded PPP has been returned to an agreed value, replacing the existing path with the new path (1330) and stopping (1326), M) where all degraded PPPs are unreturned to an agreed value, determining whether at least one renegotiable PPP is enhanced (1332), N) where at least one renegotiable PPP is enhanced, replacing the existing path with the new path (1330) and stopping (1326), O) where all renegotiable PPP are unenhanced, determining whether cost is reduced by at least %_improve (i.e., new cost-≦current_cost*(1-%_improve/100)(1334), P) where the cost is reduced by at least %_improve, replacing the existing path with the new path (1330) and stopping (1326), and Q) where the cost is unimproved by %_improve, stopping (1326). %_improve is a predetermined cost improvement value, and Current_Cost is a cost of the path.

Where all PPPs are undegraded and for all renegotiable PPPs, the agreed value is equal to the requested value, reoptimization is applied, and it typically includes setting an acceptable cost to a form of current cost*(1-%_improve/100), and then continues as described above.

The step of determining a path in accordance with the updated performance constraints utilizes a predetermined routing strategy. In the preferred embodiment of the invention, a rule-based routing strategy is used.

Figure 14:
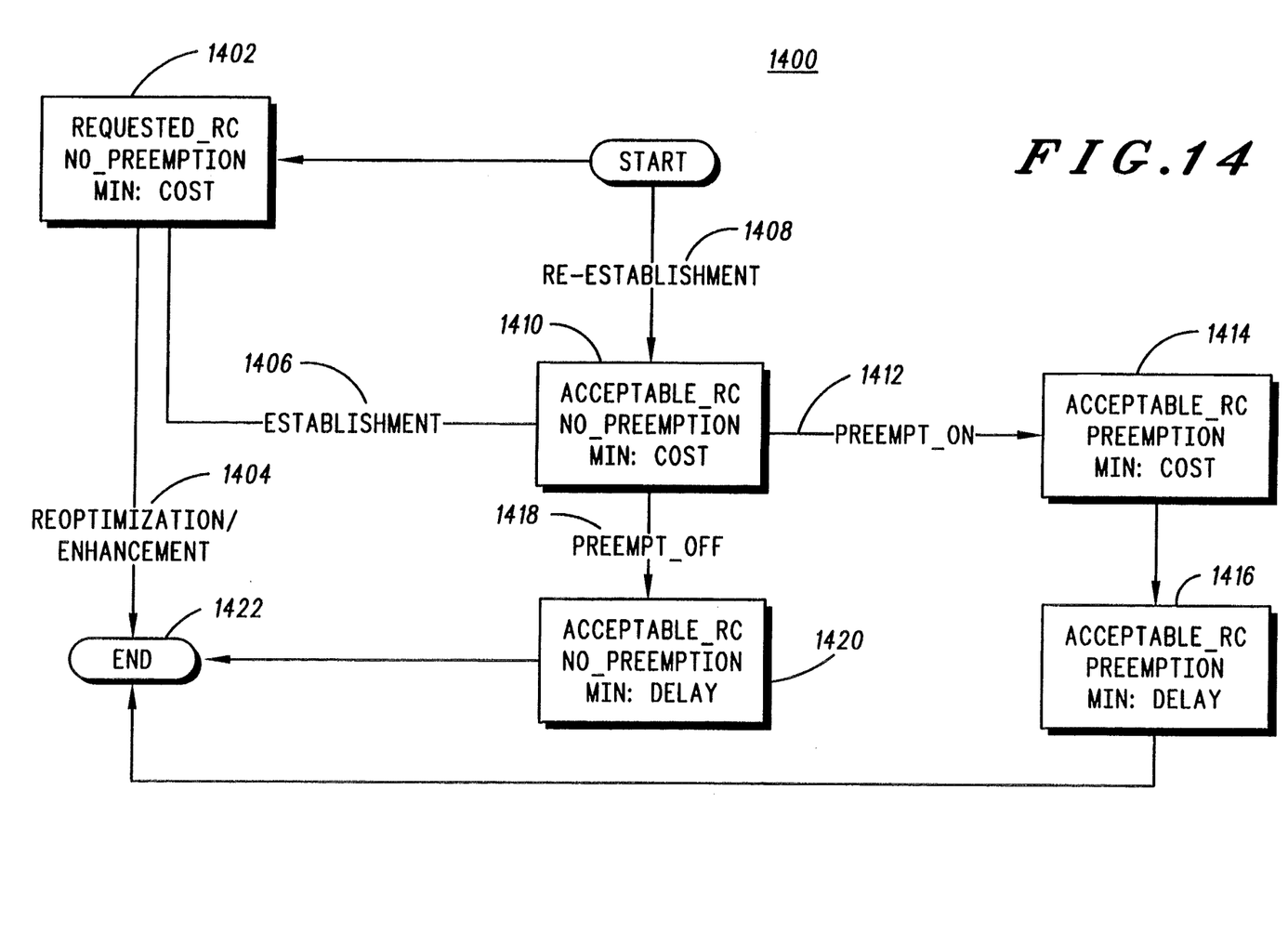
FIG. 14 is a flow chart of steps for a rule-based routing strategy in accordance with the method of the present invention.

Steps of a rule-based routing strategy in accordance with the method of the present invention are shown in a flow chart in FIG. 14, numeral 1400. In FIG. 14, RC represents resource constraints. The method provides dynamic connection management in integrated communication networks such that an acceptable quality of service (QOS) over an entire duration of a connection is maintained wherein rule-based routing is utilized. The method includes the steps of one of 1-2: 1) utilizing requested resource constraints for preemption-free and cost minimization routing (1402) where the connection management procedure is establishment, reoptimization, or enhancement, one of 1a-1b: 1a) stopping (1422) where the connection management procedure is reoptimization or enhancement (1404), 1b) utilizing acceptable resource constraints for preemption-free and cost minimization routing (1410) where the connection management procedure is establishment (1406), and one of 1b1-1b2: 1b1) where preemption is unutilized (Preempt_Off, 1418), utilizing acceptable resource constraints for preemption-free (No_Preemption) and delay minimization routing (1420), and 1b2) where preemption is utilized (Preempt_On, 1412), utilizing acceptable resource constraints with preemption and cost minimization routing (1414) and acceptable resource constraints with preemption and delay minimization routing (1416), and 2) utlizing acceptable resource constraints for preemption-free and cost minimization routing (1410) where the connection management procedure is reestablishment (1408), and one of 2a-2b: 2a) where preemption is unutilized (Preempt_Off, 1418), utilizing acceptable resource constraints for preemption-free and delay minimization routing (1420), and 2b) where preemption is utilized (Preempt_On, 1412), utilizing acceptable resource constraints for preemption and cost minimization routing (1414) and acceptable resource constraints for preemption and delay minimization routing (1416).

The present invention allows maintenance of acceptable quality of service over the entire duration of a connection, enhancing QOS whenever it is possible, supporting in-call QOS renegotiation, as well as recovering from connection failures and preemption. The enhancement procedure of the invention is a novel feature in connection management. While the prior art offers QOS guarantee only at the time a connection is established, the present invention additionally examines the connection from time to time and enhances its QOS whenever it is necessary and possible.

In addition, the present invention offers a novel approach to in-call QOS renegotiation. It enables the network to automatically adjust the agreed QOS towards the requested level. In the prior art, in-call QOS renegotiation involves interactions between the network and the end-users, which is not possible for permanent connections.

With the present invention, recovery from connection failures and preemption is more likely to be successful than that in the prior art due to the possibility of re-establishing connections with a compromise in the QOS and subsequently having the QOS enhanced.

Although exemplary embodiments are described above, it will be obvious to those skilled in the art that many alterations and modifications may be made without departing from the invention. Accordingly, it is intended that all such alterations and modifications be included within the spirit and scope of the invention as defined in the appended claims.

We claim:

1. A method for dynamic connection management in integrated communication networks such that an acceptable quality of service over an entire duration of a connection is maintained, comprising the steps of:
   1A) determining when re-establishment is needed and setting a re-establishment delay timer/retry counter,
   1B) performing an update on at least a predetermined performance constraint, and
   1C) determining a path for supporting the connection based on the updated performance constraints and utilizing a predetermined scheme for path implementation,
wherein the predetermined scheme for path computation and implementation includes the steps of:
   1D) computing a path in accordance with the updated performance constraints,
   1E) determining whether the path is available,
   1F) where the path is unavailable, determining whether one of: the re-establishment delay timer has expired and the re-establishment retry counter has reached a predetermined limit, and one of 1F1–1F2;
      1F1) where one of; the re-establishment delay timer is unexpired and the re-establishment retry counter is yet to reach said predetermined limit, waiting a predetermined time for a next retry, and then recycling to computing a path in accordance with the updated performance constraints,
      1F2/where one of: the re-establishment delay timer is expired and the re-establishment retry counter has reached said determined limit, stopping the re-establishment process and where the path is available, using the path for re-establishment, then stopping the re-establishment process.

2. A method for dynamic connection management in integrated communication networks such that an acceptable quality of service over an entire duration of a connection is maintained, comprising the steps of:
   2A) upon enhancement being triggered, adjusting the acceptable cost where reoptimization is appropriate, and providing conditions for accepting an available path,
   2B) applying an update to each predetermined performance constraint,
   2C) determining a new path for supporting the connection based on the updated performance constraints and utilizing a predetermined scheme for path implementation to replace the existing path,
wherein the predetermined scheme for path implementation includes the steps of:
   2D) determining said new path in accordance with the updated performance constraints,
   2E) determining whether the new path is available,
   2F) where the new path is unavailable, stopping,
   2G) where the new oath is available, determining whether at least one degraded said predetermined performance parameter has been returned to an agreed value,
   2H) where at least one degraded said predetermined performance parameter has been returned to said agreed value, replacing the existing path with the new path and stopping,
   2I) where all degraded said predetermined performance parameters are unreturned to said agreed value, determining whether at least one renegotiable said predetermined performance parameter is enhanced,
   2J) where at least one renegotiable said predetermined performance parameter is enhanced, replacing the existing path with the new path and stopping,
   2K) where all renegotiable said predetermined performance parameters are unenhanced, determining whether cost is reduced by at least % improve, where % improve is a predetermined cost improvement value,
   2L) where the cost is reduced by at least % improve, replacing the existing path with the new path and stopping, and
   2M) where the cost is unimproved by % improve, stopping.

3. The method of claim 2 wherein the predetermined scheme for path implementation includes the steps of:
   3A) determining a new path in accordance with the updated performance constraints,
   3B) determining whether the new path is available,
   3C) where the new path is unavailable, stopping,
   3D) where the new path is available, determining whether at least one degraded predetermined performance parameter has been returned to an agreed value,
   3E) where at least one degraded predetermined performance parameter has been returned to an agreed value, replacing the existing path with the new path and stopping,
   3F) where all degraded predetermined performance parameters are unreturned to an agreed value, determining whether at least one renegotiable predetermined performance parameter is enhanced,
   3G) where at least one renegotiable predetermined performance parameter is enhanced, replacing the existing path with the new path and stopping,
   3H) where all renegotiable predetermined performance parameter are unenhanced, determining whether cost is reduced by at least % improve, is a predetermined cost improvement value,
   3I) where the cost is reduced by at least % improve, replacing the existing path with the new path and stopping, and
   3J) where the cost is unimproved by % improve, stopping.

4. A device for dynamic connection management in integrated communication networks such that an acceptable quality of service (QOS) over an entire duration of a connection is maintained, comprising:
   4A) a re-establishment manager, for utilizing network information for determining when re-establishment is needed, monitoring the extent of re-establishment retry utilizing one of re-establishment timing and retry counting, and instructing a performance constraint modifier how performance constraints should be updated, 4B) said performance constraint modifier, operably coupled to the re-establishment manager, for applying a rule which is one of:
4B1) a predetermined continuation rule,
4B2) a predetermined relaxation rule, and
4B3) a predetermined enhancement rule to each performance constraint according to the instructions from the re-establishment manager to provide updated performance constraints, 4C) said path computer/implementor, operably coupled to the re-establishment manager and to the performance constraint modifier, for determining a path for supporting the connection that satisfies the updated performance constraints utilizing a predetermined routing strategy, and where said path is available, implementing the path according to a predetermined scheme that is controlled by the re-establishment manager wherein one of:
4D) in re-establishment timing, a predetermined limit is set on the length of time in which re-establishment retry attempts are permitted, and
4E) in re-establishment retry counting, a predetermined limit is set on the number of re-establishment retry attempts permitted, wherein the performance constraint modifier is further utilized for enhancement and reoptimization, and further comprising:
4F) an enhancement/reoptimization manager for utilizing network information for determining when one of: enhancement and reoptimization is needed and providing the conditions for accepting an available path and instructing a performance constraint modifier how performance constraints should be updated.

4G) the performance constraint modifier, operably coupled to the enhancement/reoptimization manager, for applying an rule which is one of:
4G1) said predetermined continuation rule,
4G2) said predetermined relaxation rule, and
4G3) said predetermined enhancement rule to each performance constraint of said plurality of performance constraints according to the instructions from the enhancement/reoptimization manager, and 4H) said path computer/implementor, operably coupled to said performance constraint modifier and to said enhancement/reoptimization manager, for determining a path for supporting the connection that satisfies the updated performance constraints utilizing a predetermined routing strategy, and where said path is available, implementing the oath according to a predetermined scheme that is controlled by the enhancement/reoptimization manager, wherein said path computer/implementor further performs a relaxation/continuation update on agreed values for each renegotiable/unrenegotiable predetermined performance parameter respectively, 5. A method for dynamic connection management in integrated communication networks such that an acceptable quality of service, QOS, over an entire duration of a connection is maintained, comprising the steps of:

5A) allocating network resources along a predetermined path, wherein the level of network resources is one that the end-users are willing to accept and the network agrees to provide,
5B) determining when one of connection re-establishment, connection enhancement, and connection reoptimization is needed, and executing one of: a predetermined connection re-establishment, connection enhancement, and connection reoptimization procedure accordingly,
5C) where quality of service is re-negotiable, performing an update on each predetermined performance constraint associated with a re-negotiable quality of service parameter, by adjusting its range of acceptable values, the agreeable region, and
5D) determining, when necessary, a new path based on the updated performance constraints for replacing a previously selected path, and utilizing a predetermined scheme for implementing the new path.

6. The method of claim 5, wherein the steps for determining when one of connection re-establishment, connection enhancement, and connection reoptimization is needed consist of:
6A) monitoring events of preemption and connection failure, and triggering a connection re-establishment procedure when one such event occurs,
6B) monitoring events of a predetermined network administrator's request for connection enhancement, a predetermined connection enhancement periodic timer expiration, and a predetermined time-of-day connection enhancement appointment, and triggering a connection enhancement procedure when one such event occurs,
6C) monitoring events of a predetermined network administrator's request for connection reoptimization, a predetermined connection reoptimization periodic timer expiration, and a predetermined time-of-day connection reoptimization appointment, and triggering a connection reoptimization procedure when one such event occurs.

7. The method of claim 5, wherein the update for performance constraints depends on whether quality of service re-negotiation is needed for one of: connection re-establishment, enhancement, and reoptimization, in accordance with the following steps;
7A) where quality of service re-negotiation is needed for connection re-establishment, utilizing the following steps:
7A1) determining whether each agreed value associated with a predetermined performance parameter is renegotiable, and:
7A2) where renegotiable, adjusting automatically the agreeable region associated with the performance parameter using a relaxation update, and
7A3) where non-renegotiable, adjusting using a continuation update,
7B) where quality of service re-negotiation is needed for one of connection enhancement and connection reoptimization, utilizing the following steps:
7B1) determining whether each agreed value associated with a predetermined performance parameter is renegotiable, and:
7B2) where renegotiable, adjusting automatically the agreeable region associated with the performance parameter using an enhancement update, and
7B3) where non-renegotiable, adjusting using a continuation update.

8. The method of claim 5 wherein the predetermined connection re-establishment procedure, and the corresponding predetermined scheme for computing and implementing the new path include the steps of:
- 8A) setting one of a re-establishment delay timer and a retry counter to prevent path computation for re-establishment to be carried out indefinitely,
- 8B) computing a path in accordance with the updated performance constraints,
- 8C) determining whether the path is available,
- 8D) where the path is unavailable, determining whether one of: the re-establishment delay timer has expired and the re-establishment retry counter has reached a predetermined limit, and one of 8D1-16D2:
  - 8D1) where one of: the re-establishment delay timer is unexpired and the re-establishment retry counter is yet to reach a predetermined limit, waiting a predetermined time for a next retry, and then recycling to computing a path in accordance with the updated performance constraints,
  - 8D2) where one of: the re-establishment delay timer is expired and the re-establishment retry counter has reached a predetermined limit, stopping, and where the path is available, using the path for re-establishment, then stopping.

9. The method of claim 5 wherein the predetermined connection enhancement procedure, and the corresponding predetermined scheme for computing and implementing the new path include the steps of:
- 9A) upon enhancement being triggered, adjusting the acceptable cost where reoptimization is appropriate, and providing conditions for accepting an available path,
- 9B) applying an update to each predetermined performance constraint,
- 9C) determining a new path based on the updated performance constraints and utilizing a predetermined scheme for path implementation to replace the existing path.

10. The method of claim 5 wherein the predetermined connection re-optimization procedure, and the corresponding predetermined scheme for computing and implementing the new path include the steps of:
- 10A) upon re-optimization being triggered, determining a new path in accordance with the updated performance constraints,
- 10B) determining whether the new path is available,
- 10C) where the new path is unavailable, stopping,
- 10D) where the new path is available, determining whether at least one degraded predetermined performance parameter has been returned to an agreed value,
- 10E) where at least one degraded predetermined performance parameter has been returned to an agreed value, replacing the existing path with the new path and stopping,
- 10F) where all degraded predetermined performance parameters are unreturned to an agreed value, determining whether at least one renegotiable predetermined performance parameter is enhanced,
- 10G) where at least one renegotiable predetermined performance parameter is enhanced, replacing the existing path with the new path and stopping,
- 10H) where all renegotiable predetermined performance parameters are unenhanced, determining whether cost is reduced by at least % improve, where % improve is a predetermined cost improvement value,
- 10I) where the cost is reduced by at least % improve, replacing the existing path with the new path and stopping, and
- 10J) where the cost is unimproved by % improve, stopping.

* * * * *